C. C. WILLIAMS.
HOLDER.
APPLICATION FILED APR. 10, 1908.
905,038.
Patented Nov. 24, 1908.
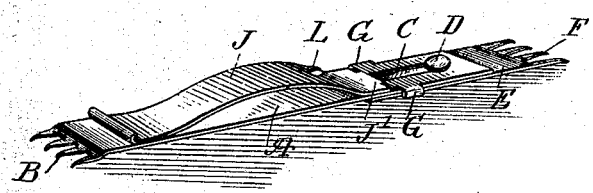
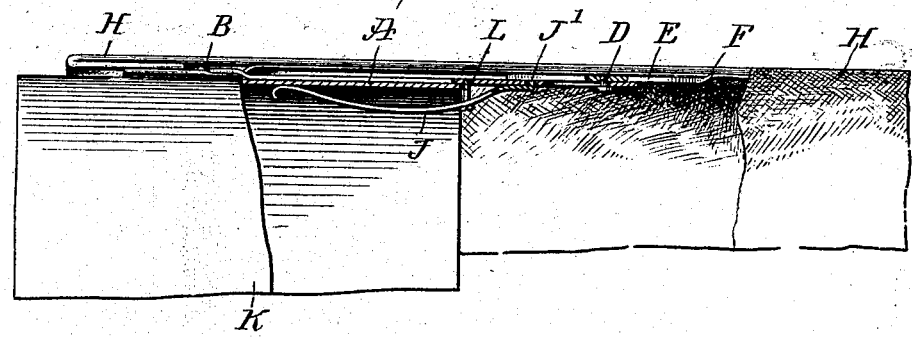
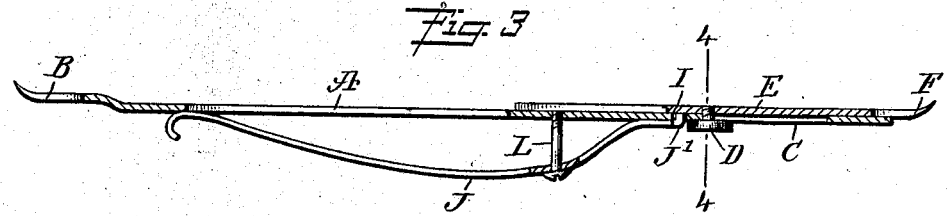
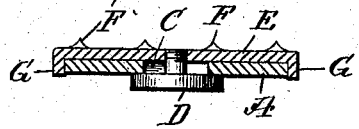
WITNESSES
E. G. Bromley
INVENTOR
Charles C. Williams
BY
ATTORNEYS

UNITED STATES PATENT OFFICE.

CHARLES CORNELIUS WILLIAMS, OF WESTFIELD, PENNSYLVANIA.

HOLDER.

No. 905,038.     Specification of Letters Patent.     Patented Nov. 24, 1908.

Application filed April 10, 1908. Serial No. 426,217.

*To all whom it may concern:*

Be it known that I, CHARLES CORNELIUS WILLIAMS, a citizen of the United States, and a resident of Westfield, in the county of Tioga and State of Pennsylvania, have invented a new and Improved Holder, of which the following is a full, clear, and exact description.

The invention relates to holders for cuffs, papers, tickets and other articles.

The object of the invention is to provide a new and improved holder, arranged for convenient attachment to a support for easy manipulation, to engage and securely hold the article in place and for ready adjustment, especially when used as a cuff holder, to adjust the cuff relative to the coat sleeve.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a perspective view of the improvement; Fig. 2 is a side view of the improvement as applied to a coat sleeve for holding a cuff, the sleeve and cuff being in section, and the improvement partly in section. Fig. 3 is an enlarged side view of the improvement partly in section. Fig. 4 is an enlarged transverse section of the same, on the line 4—4 of Fig. 3.

A plate A of sheet metal or other suitable material is provided at one end with prongs B, and near the other end of the plate A is formed a lengthwise-extending slot C, through which passes a clamping screw D, engaging an extension arm E, provided at its outer end with prongs F, similar to the prongs B. The sides of the plate A are provided with guide flanges G straddling the side edges of the extension arm E, so as to hold the latter against transverse movement, it being understood that when the clamping screw D is loosened, the extension arm E can be moved lengthwise on the plate A to a desired position, and after the adjustment has been made the clamping screw D is screwed up to securely clamp the extension arm E in position on the plate A.

The prongs B and F are bent outwardly for engagement with the lining of a coat sleeve H, as plainly illustrated in Fig. 2, to securely attach the holder to the coat sleeve.

In the plate A adjacent to the slot C is formed a transverse slot I, into which projects the flange J' of a spring J, operating in conjunction with the plate A for clamping a cuff K or other article between the spring J and the plate A, as indicated in Fig. 2. The tension of the spring J can be regulated by a screw L engaging the spring J and screwing in the plate A.

In using the device the set screw D is loosened, then the prongs B are engaged with the lining of the coat sleeve H, and then the plate E is moved lengthwise in an outward direction relative to the plate A, so as to engage the prongs F with the lining of the coat sleeve H, and then the set screw D is screwed up to securely lock the extension arm E in position. The cuff K is now passed between the plate A and spring J, which latter securely clamps the cuff in place against the plate A. The inward movement of the cuff K is limited by the adjusting screw L for the spring J.

Now from the foregoing it will be seen that the cuff holder can be readily placed in position in the coat sleeve at any desired distance from the end thereof, and the holder securely clamps the cuff in place and in the desired relation to the end of the coat sleeve H.

The cuff holder is very simple and durable in construction and can be readily manipulated to securely attach the holder to a suitable support and to hold the article in place.

Having thus described my invention, I claim as new and desire to secure by Letters Patent:

1. A holder comprising a plate provided at one end with prongs off-set from the plate, an extension arm having off-set prongs on the plate, said plate having a slot, a spring overlying the plate and having a flange at one end engaging the slot, a screw for regulating the tension of the spring, and a set screw passing through the slot and threaded into the arm for adjusting the plate, and the arm with respect to each other.

2. A holder, comprising a plate having prongs at one end, an extension arm having prongs and held adjustably on the other end of the said plate, a spring overlying the said plate and having a flange at one end engaging a slot in the said plate, and a screw for regulating the tension of the said spring.

3. A holder, comprising a plate provided with a lengthwise-extending slot and a transverse slot, an extension arm, a clamping screw engaging the said plate and arm and extending through the said lengthwise slot, a spring having a flange engaging the said transverse slot, and a screw engaging the said spring and plate for regulating the tension of the spring.

In testimony whereof I have signed my name to this specification in the presence of two subscribing witnesses.

CHARLES CORNELIUS WILLIAMS.

Witnesses:
 ORRIN E. KIMBALL,
 FRED. H. HUBERS.